Feb. 16, 1971   P. R. GLEY   3,563,098
AUTOMATIC QUICK RELEASE MECHANISM
Filed June 28, 1968   2 Sheets-Sheet 1
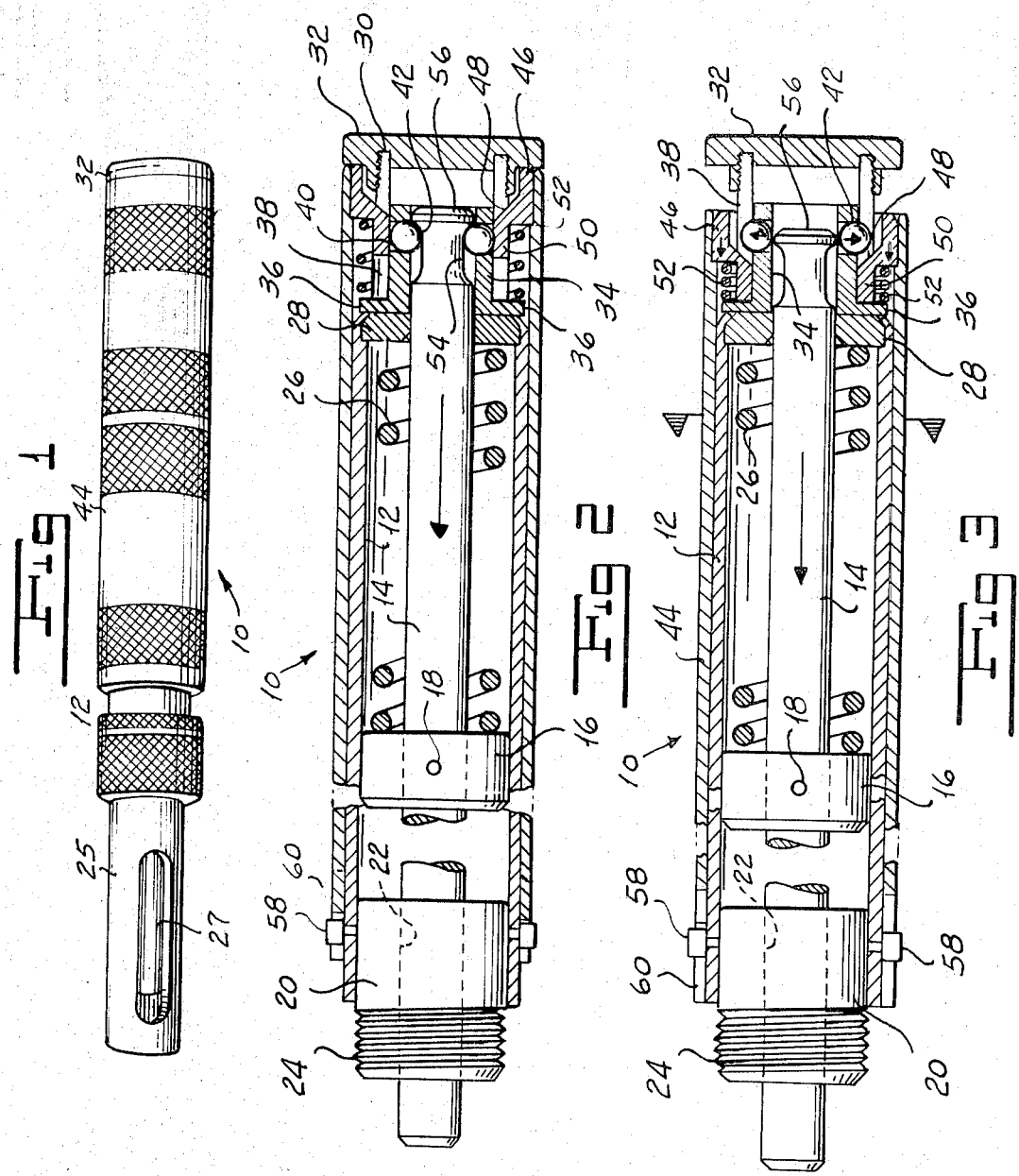
INVENTOR.
Paul R. Gley
BY
Shenier & O'Connor
ATTORNEYS

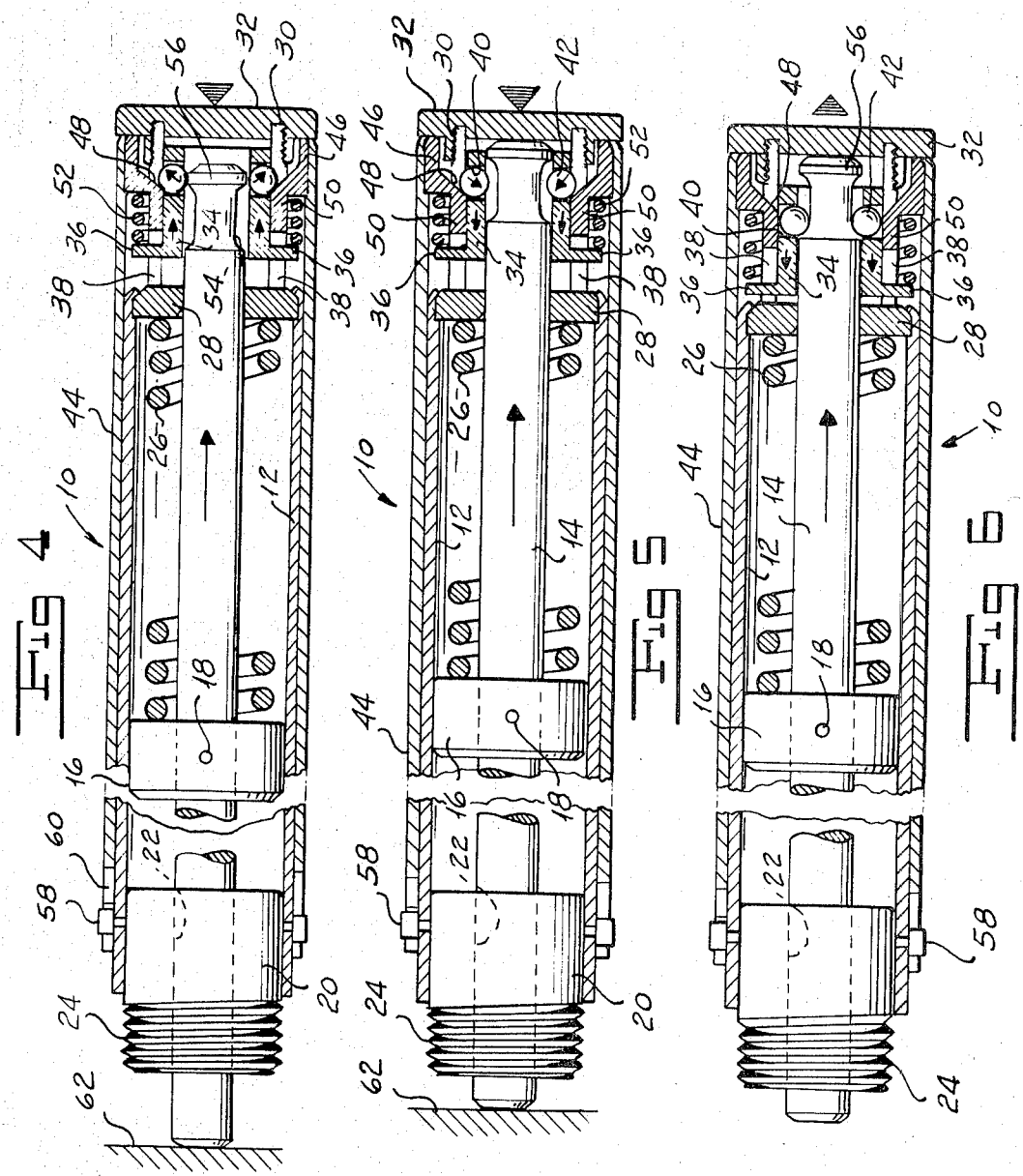

United States Patent Office 3,563,098
Patented Feb. 16, 1971

3,563,098
AUTOMATIC QUICK RELEASE MECHANISM
Paul R. Gley, Hillsdale, N.J., assignor to Rex Chainbelt Inc., Milwaukee, Wis., a corporation of Wisconsin
Filed June 28, 1968, Ser. No. 741,017
Int. Cl. G05g 17/00
U.S. Cl. 74—2
10 Claims

ABSTRACT OF THE DISCLOSURE

An improved automatic quick release locking mechanism in which a lock-operating spring normally urges a locking ball carrier movably supported on a barrel to such a position relative to a ball actuator secured to an outer sleeve, as to move locking balls to positions at which they may occupy a recess in a plunger rod slidably supported on the barrel to lock the rod against movement under the influence of a drive spring. To release the mechanism, the plunger-actuated element is held against a surface and the sleeve is moved toward the surface to move the actuator away from the balls to free them for movement under the influence of the plunger head to free the plunger rod. To cock the mechanism, the end of the plunger rod is held against a resistant surface and pressure is exerted against a cap supported by the barrel so that the plunger head moves the balls and carrier against the operation of the locking spring to a position at which the balls are free of the actuator, thus to permit the plunger head to travel thereby to permit the locking spring to move the ball carrier back to a position at which the balls are moved into the plunger locking recess under the action of the locking spring. Upon release of the cap, the balls will hold the plunger rod locked.

BACKGROUND OF THE INVENTION

Various spring-loaded plunger assemblies are known in the prior art in which means are provided for releasably holding a plunger in a retracted position against the action of a drive spring. One example of a use of such an assembly is to drive the needle of a serum-injecting mechanism. Most of the devices of the type described above embody a number of defects. The arrangements are such that the force exerted by the locking mechanism to hold it in a retracted position is relatively high so that a large releasing force is required. The locking mechanisms of the prior art usually require relative movement of parts in a direction which is opposite to that in which the plunger moves upon release. This fact makes the devices inconvenient to use. If a relatively light releasing force is provided, the resultant drive force likewise is small. Releasable locking mechanisms of the type known in the prior art have a small throw.

My copending application, Ser. No. 696,793, filed Jan. 10, 1968, now Pat. No. 3,543,603, describes an automatic quick release locking mechanism which overcomes the defects of locking mechanisms of the prior art pointed out hereinabove. Movement of the release mechanism is in the same direction as is the resultant movement of the plunger upon release. The mechanism requires only a relatively light locking force for the high drive force provided thereby. It has a relatively long throw as compared with releasable locking mechanisms of the prior art.

While the mechanism shown in my copending application successfully overcomes the defects of releasable locking mechanisms pointed out hereinabove, it is not as convenient to use as is desirable. The device includes an outer sleeve which is moved relative to a barrel in the same direction as the resultant plunger movement to release the plunger. This operation is satisfactory. However, in order to cock the locking mechanism shown in my copending application referred to hereinabove, with the exposed end of the plunger rod held against a resistant surface, a force must be exerted on the sleeve grasped by the hand of the operator to cock the device. This cocking operation is not as convenient as is desirable. First, merely as a matter of preference, an individual may prefer to push with the palm of his hand against the end of the mechanism to cock it. Secondly, it is believed that a greater force can be exerted against the drive spring in this manner than can easily be exerted by a person grasping the outer sleeve in his hand and then pushing. Owing to the fact that a greater force can be exerted by pushing on an end against the action of a drive spring, the driving force provided by the spring can be increased.

I have invented an improved quick release locking mechanism which facilitates the operation of cocking the mechanism while retaining all of the advantages of the quick release mechanism shown in my copending application. My quick release operating mechanism is more convenient to use than is the mechanism shown in my copending application. It permits a heavier driving spring to be employed.

SUMMARY OF THE INVENTION

One object of my inventtion is to provide an improved quick release operating mechanism which overcomes the defects of locking mechanisms known in the prior art.

Another object of my invention is to provide an improved quick release operating mechanism in which the direction of movement to release the mechanism is the same as that of the resultant movement of the plunger.

Another object of my invention is to provide a quick release operating mechanism having a relatively long throw.

A further object of my invention is to provide a quick release operating mechanism which is easily cocked.

Still another object of my invention is to provide a quick release operating mechanism which permits the use of a heavier drive spring than do quick release mechanisms of the prior art.

Other and further objects of my invention will appear from the following description.

In general my invention contemplates the provision of a quick release operating mechanism which can be cocked by a force exerted on an end cap supported on the inner barrel of the mechanism. Specifically, a lock-operating spring normally moves a ball carrier supported on the inner barrel to a position relative to a ball actuator on the outer sleeve at which the actuator urges the balls to positions at which they can engage a recess adjacent a head on the mechanism plunger releasably to hold the plunger against the action of the drive spring. To release the mechanism, the rod-operated device is held against a resistant surface and the outer sleeve is moved toward the surface to move the actuator relative to the balls to release the same to permit the drive spring to cause the plunger head to move the balls out of locking position, thus to free the plunger. To cock the mechanism, the exposed plunger end is held against a resistant surface and in response to a force exerted on a cap on the end of the inner barrel, the plunger head first moves the locking balls and the carrier to a position relative to the actuator which frees the balls to permit the head to move past the balls. When that occurs, the locking operating spring repositions the carrier relative to the actuator to cause the latter to move the balls into the recess adjacent the plunger head to lock the mechanism.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a perspective view of my improved automatic quick release locking mechanism in use with a serum injecting device.

FIG. 2 is a sectional view of my improved automatic quick release locking mechanism in its locked condition.

FIG. 3 is a sectional view of my improved automatic quick release locking mechanism illustrating the action of the parts when the mechanism is released.

FIG. 4 is a sectional view of my improved automatic quick release locking mechanism illustrating the action of the parts during the initial portion of a cocking operation.

FIG. 5 is a sectional view of my improved automatic quick release locking mechanism illustrating the action of the parts during an intermediate portion of a cocking operation.

FIG. 6 is a sectional view of my automatic quick release locking mechanism illustrating the action of the parts during the terminal portion of a cocking operation.

DESCRIPTION OF THE PREFERRED EMBODIMENT

Referring now to the drawings, my improved quick release locking mechanism, indicated generally by the reference character 10, includes an inner barrel 12 which receives a plunger rod 14 having a guide piston 16 secured thereto by any suitable means, such as a pin 18. I secure an adapter 20 having an axial guide bore 22 in one end of the barrel 12. Screw threads 24 or the like on the adapter 20 permit me to secure a carrier 25 for receiving a serum injecting device 27 or the like to the assembly 10 for operation thereby. As is known in the art, the plunger 14 is adapted to be driven to operate the needle (not shown) of the device 27 to inject a serum or the like into the body of a patient.

A plunger drive spring 26 bears between the base 28 of a ball carrier guide 30, to be described more fully hereinafter, and the piston 16 normally to urge plunger 14 downwardly as viewed in FIGS. 2 to 6. From the base 28 guide 30 extends upwardly to receive a cap 32 screwed or otherwise secured to the top of the guide.

My mechanism 10 includes a locking ball carrier 34 received within guide 30 and having ears 36 extending outwardly through slots 38 in the guide 30. Bores 40 in the wall of the carrier 34 receive locking balls 42. My mechanism 10 includes an outer sleeve 44 telescopically received by the barrel 12. I secure a ball actuator 46 to the top of sleeve 44. The actuator 46 includes cam surfaces 48 leading to ball locking portions 50 of the actuator 46. A spring 52 bears between the actuator 46 and the ears 36 normally to urge the carrier away from the actuator.

In the condition of the parts illustrated in FIG. 2, locking portions 50 of the actuator 46 are adjacent the openings 40 so as to position balls 42 inwardly of the bores so that they engage in a locking recess 54 adjacent the head 56 formed on the plunger 14. In this position of the parts, plunger rod 14 is locked against movement downwardly under the action of spring 26. If desired, I may provide a positive lock to prevent accidental release of the mechanism. For example, pins 58 on the barrel 12 may ride in right angle recesses 60 in the sleeve 44 to provide a positive lock. As is known in the art, with the pins 58 in the circumferentially extending portions of the slots 60, sleeve 44 cannot be moved downwardly on the barrel 12. Conversely, if the sleeve 44 is rotated slightly on the barrel 12 to bring the pins into registry with axially extending portions of the slots 60, relative movement of the sleeve and barrel is permitted.

In operation of my improved automatic quick release locking mechanism, as is pointed out hereinabove, the relative positions of the parts in the locked condition of the mechanism 10 are shown in FIG. 2. From this condition of the parts, to release the mechanism sleeve 44 may first be rotated slightly on the barrel 12 to free the mechanism for operation. When that has been done, the carrier 25 on the adapter 20 is moved into engagement with a resistant surface and the sleeve is slid to the left as indicated by the arrows in FIG. 3. It will be noted that in FIGS. 3 to 6, I have indicated the directions of movement of the various parts on the parts themselves. Thus, when the sleeve 44 moves downwardly relative to the barrel 12, spring 52 is compressed and the actuator 46 moves to a position relative to the carrier 34 at which balls 42 are free of the locking portions 50 and of the cam surfaces 48. When that occurs, spring 26 begins to drive plunger 14 in the direction of the arrow in FIG. 3. Under the action of this force, head 56 first cams the freed balls outwardly of the carrier bores 40 and ultimately moves past the balls so that the plunger is completely free for movement under the action of spring 26.

After an operation of the mechanism in the manner just described, the carrier 25 is removed from the adapter 20. To recock the mechanism, the exposed end of plunger 14 is brought into engagement with a resistant surface 62 and a force is exerted against the cap 32, as indicated by the arrow in FIG. 3, as by pressing on the cap with the palm of the hand. Under the action of this force, the spring 26 is compressed and head 56 engages the balls 42 to move the balls and the carrier 34 upwardly as viewed in FIGS. 2 to 6. Ultimately, the balls arrive at a position beyond the locking portions 50 and adjacent the cam surfaces 48. When that occurs, continued pressure causes the head to move the balls 42 outwardly of the carrier until the head moves past the balls.

When the head 56 is moved to a position beyond the balls 42, the carrier 34 is free and spring 52 moves the carrier downwardly with respect to the actuator 46 to cause the balls to be cammed inwardly by the surfaces 48 to positions in which they engage in the recess 54, in which positions they are held by the locking portions 50.

After the cocking operation has continued in the manner described until the head 56 bottoms on cap 32 to permit the carrier to move to a position at which the balls have been displaced to their locking positions, the locking force exerted on the cap 32 is relieved as indicated in FIG. 6. From this condition of the parts, carrier 34 continues to move until it bottoms on base 28 and plunger 14 moves in the direction of the arrow in FIG. 6 until the balls 42 are just under the head 56 at the top of groove 54 as viewed in the drawings. This is the position of the parts illustrated in FIG. 2. My mechanism is now cocked and ready for use.

While I have described a use of my mechanism in connection with a serum injecting device, it will readily be appreciated that it is equally applicable to any device wherein release of a rod is required to perform an operation.

It will be seen that I have accomplished the objects of my invention. I have provided an improved automatic quick release locking mechanism. My mechanism operates with a resulting movement which is in the same direction as the resultant plunger movement. My mechanism requires only a relatively light locking force for the driving force provided thereby. It is cocked in response to a force exerted on a cap supported on the barrel. It is thus more convenient to use than are mechanisms of the prior art. It permits of the use of a heavier locking spring than is permitted by mechanisms of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to

Having thus described my invention, what I claim is:

1. An automatic quick release mechanism including in combination, a housing, a plunger mounted in said housing for movement in a certain direction between a cocked position and an extended position, a first spring in said housing for biasing said plunger for movement from said cocked position to said extended position, and releasable means for locking said plunger in said cocked position with said spring loaded, said releasable means comprising a locking element carrier mounted for limited movement on said housing and an externally accessible manually operable member mounted on said housing for sliding movement in said direction from a first position at which said plunger is locked in said cocked position to a second position at which said plunger is released and a second spring biased between said carrier and said manually operable member for biasing said member to said first position.

2. An automatic quick release mechanism as in claim 1 in which said releasable means comprises a recess in said plunger, a detent ball adapted to cooperate with said recess and supported on said carrier for movement transversely of said housing and in the direction of the length of said housing.

3. An automatic quick release mechanism as in claim 1 in which said releasable means comprises a recess in said plunger, a detent ball adapted to cooperate with said recess and supported on said carrier for movement transversely of said housing and in direction of the length thereof, and an element on said member for engaging said ball to move said ball into said recess.

4. An automatic quick release mechanism including in combination, a housing, a plunger mounted on said housing for movement in a certain direction from a retracted position to an extended position, a spring biasing said plunger for movement from retracted to extended position, said plunger having a recess therein, a locking element, a carrier for supporting said element for movement between a first position at which it may enter said recess and a second position out of said recess, an actuator adapted to engage said element to move it to said first position, means mounting said carrier and said actuator on said housing for movement between a first relative position at which said actuator engages said element and a second relative position at which said actuator is out of engagement with said element, and a spring for biasing said carrier and said actuator to said first relative position.

5. An automatic quick release mechanism as in claim 4 including a handle for moving said actuator to the second relative position of the carrier and actuator.

6. An automatic quick release mechanism as in claim 4 including means responsive to movement of said plunger from its extended position to its retracted position for moving said carrier to the second relative position of the carrier and actuator.

7. An automatic quick release mechanism as in claim 6 in which said means responsive to plunger movement is a head on said plunger adapted to engage said ball.

8. An automatic quick release mechanism as in claim 4 including a handle for moving said actuator to the second relative position of the carrier and actuator, and means responsive to movement of said plunger from its extended to its retracted position for moving said actuator to the second relative position of said carrier and said actuator.

9. An automatic quick release mechanism including in combination, a barrel, an elongated plunger mounted in telescoping relationship with said barrel for movement between a retracted position and an extended position, a spring biasing said plunger for movement from its retracted to its extended position, said plunger having a recess therein, a locking element, a carrier mounting said locking element for movement between a first position at which it may enter said recess and a second position out of said recess, an outer sleeve, an actuator carried by said sleeve for engaging said element to move it to its first position, means mounting said sleeve and said carrier on said barrel for movement between a first relative position at which said actuator engages said element and a second relative position at which said actuator is free of said element and a spring for biasing said actuator and said carrier to the first relative position.

10. An automatic quick release mechanism as in claim 9 including means responsive to movement of said plunger from said extended to said retracted position for moving said carrier to the second relative position of the carrier and the actuator.

References Cited

UNITED STATES PATENTS

| 3,182,660 | 5/1965 | Weydanz et al. | 128—218.2 |
| 2,455,270 | 11/1948 | Ravella | 74—2(UX) |
| 3,233,496 | 2/1966 | De Pew et al. | 85—5(B) |
| 3,385,559 | 5/1968 | Churchill | 74—527(X) |
| 3,403,679 | 10/1968 | Sinclair et al. | 128—218.2 |

FRED C. MATTERN, JR., Primary Examiner

F. D. SHOEMAKER, Assistant Examiner

U.S. Cl. X.R.

74—527; 24—211; 128—218